(12) United States Patent
Yadlowsky

(10) Patent No.: US 9,835,812 B2
(45) Date of Patent: Dec. 5, 2017

(54) MULTI-OPTICAL FIBER AGGREGATE

(71) Applicant: Corning Incorporated, Corning, NY (US)

(72) Inventor: Michael John Yadlowsky, Sunnyvale, CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/227,373

(22) Filed: Aug. 3, 2016

(65) Prior Publication Data

US 2017/0038544 A1 Feb. 9, 2017

Related U.S. Application Data

(60) Provisional application No. 62/200,815, filed on Aug. 4, 2015.

(51) Int. Cl.
| | | |
|---|---|---|
| G02B 6/44 | (2006.01) | |
| G02B 6/02 | (2006.01) | |
| G02B 6/06 | (2006.01) | |
| G02B 6/08 | (2006.01) | |
| G02B 6/036 | (2006.01) | |

(52) U.S. Cl.
CPC ....... *G02B 6/4403* (2013.01); *G02B 6/02395* (2013.01); *G02B 6/06* (2013.01); *G02B 6/08* (2013.01); *G02B 6/02042* (2013.01); *G02B 6/0365* (2013.01); *G02B 6/03627* (2013.01)

(58) Field of Classification Search
None
See application file for complete search history.

(56) References Cited

U.S. PATENT DOCUMENTS

| 4,444,463 | A | | 4/1984 | Schneider et al. | |
|---|---|---|---|---|---|
| 4,648,892 | A | * | 3/1987 | Kittrell | A61B 17/22 600/342 |
| 4,755,021 | A | | 7/1988 | Dyott | |
| 4,950,047 | A | * | 8/1990 | Berkey | C03B 37/027 385/100 |

(Continued)

FOREIGN PATENT DOCUMENTS

| EP | 703475 A1 | 3/1996 |
|---|---|---|
| JP | 60154205 A | 8/1985 |

(Continued)

OTHER PUBLICATIONS

Watanabe, K., et al., "Development of Fiber Bundle Type Fan-out for Multicore Fiber." 17th Opto-Electronics & Communications Conference (OECC 2012) Technical Digest, Busan, Korea, pp. 475-476, Jul. 2-Jul. 6, 2012.

(Continued)

*Primary Examiner* — Mike Stahl
(74) *Attorney, Agent, or Firm* — John P. Ciccarelli

(57) ABSTRACT

A multi-fiber aggregate is provided. The multi-fiber aggregate includes at least two optical fibers, each of the at least two optical fibers having a core member formed from a silica-based glass and an outer cladding layer formed from a silica-based glass surrounding and in direct contact with the core member. The multi-fiber aggregate also includes a polymeric binding coating surrounding the at least two optical fibers and holding the at least two fibers in a predetermined geometry.

14 Claims, 17 Drawing Sheets

(56) References Cited

U.S. PATENT DOCUMENTS

| | | | |
|---|---|---|---|
| 5,062,685 A * | 11/1991 | Cain | C03C 25/1065 |
| | | | 385/102 |
| 5,148,509 A | 9/1992 | Kannabiran | |
| 5,152,818 A | 10/1992 | Berkey et al. | |
| 5,333,229 A * | 7/1994 | Sayegh | G02B 6/105 |
| | | | 385/102 |
| 5,519,801 A | 5/1996 | Le Noane et al. | |
| 5,548,672 A | 8/1996 | Hattori et al. | |
| 5,748,820 A | 5/1998 | Le Marer et al. | |
| 5,928,574 A | 7/1999 | DiMarcello et al. | |
| 5,949,940 A * | 9/1999 | Botelho | G02B 6/245 |
| | | | 385/114 |
| 6,089,044 A | 7/2000 | Hardy et al. | |
| 6,154,594 A | 11/2000 | Fiacco et al. | |
| 6,192,713 B1 | 2/2001 | Zhang et al. | |
| 6,473,555 B1 | 10/2002 | Kragl et al. | |
| 6,539,151 B2 | 3/2003 | Fajardo et al. | |
| 6,775,451 B1 | 8/2004 | Botelho et al. | |
| 6,849,333 B2 | 2/2005 | Schissel et al. | |
| 7,072,542 B2 | 7/2006 | Jenkins et al. | |
| 7,346,250 B1 | 3/2008 | Dabich, II et al. | |
| 9,057,815 B2 * | 6/2015 | Butler | G02B 6/4403 |
| 9,120,693 B2 | 9/2015 | Hoover et al. | |
| 9,151,887 B2 | 10/2015 | Hoover et al. | |
| 9,594,211 B1 | 3/2017 | Jain | |
| 2002/0044753 A1 | 4/2002 | Nagayama et al. | |
| 2002/0081084 A1 * | 6/2002 | Matsumoto | G02B 6/3885 |
| | | | 385/120 |
| 2002/0197032 A1 * | 12/2002 | Conrad | G02B 6/4482 |
| | | | 385/114 |
| 2003/0118301 A1 * | 6/2003 | Hurley | G02B 6/4471 |
| | | | 385/114 |
| 2004/0114895 A1 | 6/2004 | Okazaki et al. | |
| 2005/0072192 A1 | 4/2005 | Arimondi et al. | |
| 2006/0171644 A1 * | 8/2006 | Sato | G02B 6/4422 |
| | | | 385/114 |
| 2008/0226241 A1 * | 9/2008 | Sugizaki | G02B 6/03627 |
| | | | 385/114 |
| 2009/0202211 A1 | 8/2009 | Bickham | |
| 2010/0254658 A1 * | 10/2010 | Tanaka | G02B 6/4403 |
| | | | 385/54 |
| 2010/0290750 A1 | 11/2010 | Imamura | |
| 2011/0069725 A1 | 3/2011 | Shkunov et al. | |
| 2011/0229086 A1 | 9/2011 | Bradley et al. | |
| 2011/0274435 A1 | 11/2011 | Fini et al. | |
| 2012/0045169 A1 * | 2/2012 | Hu | B23K 1/0008 |
| | | | 385/33 |
| 2012/0114292 A1 | 5/2012 | Hoover et al. | |
| 2012/0155805 A1 | 6/2012 | Doerr | |
| 2013/0008210 A1 | 1/2013 | Chamorovskiy et al. | |
| 2013/0170804 A1 * | 7/2013 | Hayashi | G02B 6/02042 |
| | | | 385/128 |
| 2013/0188949 A1 | 7/2013 | Fini et al. | |
| 2015/0016791 A1 * | 1/2015 | Nagashima | G02B 6/4403 |
| | | | 385/120 |
| 2016/0223774 A1 * | 8/2016 | Bennett | H04B 10/40 |

FOREIGN PATENT DOCUMENTS

| | | |
|---|---|---|
| JP | 60225104 A | 11/1985 |
| JP | 10148718 A | 6/1998 |
| JP | 2003241038 A | 8/2003 |
| JP | 2008242449 A | 10/2008 |

OTHER PUBLICATIONS

Kokubun, Y., et al., "Dense Heterogeneous Uncoupled Multi-Core Fiber using 9 Types of Cores with Double Cladding Structure." 17th Microotics Conference (MOC' 11), Sendai, Japan, pp. 1-2, ct. 30—Nov. 2, 2011.

Rosinski, B., et al., "Using VCSEL's and Multicore Fiber for Multi-Channel Transmission." in Proc. IEEE LEOS Summer Top. Meeting—VCL, Montreal, PQ, Canada, pp. 59-60, Aug. 1997.

Stolen, R., et al., "High-Birefringence Optical Fibers by Preform Deformation." Journal of Lightwave Technology, vol. LT-2, No. 5, pp. 839-641, Oct. 1984.

* cited by examiner

US 9,835,812 B2

MULTI-OPTICAL FIBER AGGREGATE

This application claims the benefit of priority under 35 U.S.C. §119 of U.S. Provisional Application Ser. No. 62/200,815 filed on Aug. 4, 2015, the content of which is relied upon and incorporated herein by reference in its entirety.

FIELD

The present disclosure general relates to optical fibers. More particularly, the present disclosure relates to multi-fiber aggregates.

BACKGROUND

Optical fiber has become accepted as a viable alternative to traditional materials used for data signal communication. Optical fiber is now widely utilized in a variety of electronic devices to facilitate the high-speed communication of data signals at high bandwidths. However, in addition to increases in the speed and bandwidth of the electronic components in data communication devices, optical fiber users are attempting to place ever more optical fibers in ever-smaller spaces. However, packing fibers into tight spaces can cause undesirable attenuation.

Optical fiber ribbons provide one way to densely pack a plurality of optical fibers. Often, individual coated optical fibers are made, arranged in parallel to one another, and then coated with a collective coating layer and formed into a ribbon shape. However, such ribbon designs limit the density with which the optical fibers can be positioned in the ribbon. Also, such shape limits the bending capabilities of the ribbon. Furthermore, the cores of the individual optical fibers in the ribbon are often not aligned in a manner that allows for precise coupling to standard connectors or other fiber arrays.

The use of optical fiber waveguides with multiple cores sharing a single outer glass cladding has been proposed as a means of increasing the bandwidth density of communications systems. However, the difficulty of fabricating multi-core waveguides places a practical constraint on the features of the individual cores. Furthermore, the inclusion of many cores can result in large diameter waveguide structures. To maintain a given level of reliability, larger diameter glass structures are limited to larger minimum bending radii, which can complicate the routing of fibers in many applications. In addition, multicore fibers (MCF) are sensitive to external perturbations such as bending and twisting and increased cross-talk, increased loss, and decreased transmission performance have been observed with increased bending diameter of MCF relative to single core fibers.

SUMMARY

According to an embodiment of the present disclosure, a multi-fiber aggregate is provided. The multi-fiber aggregate includes at least two optical fibers, each of the at least two optical fibers having a core member formed from a silica-based glass and an outer cladding layer formed from a silica-based glass surrounding and in direct contact with the core member. The multi-fiber aggregate also includes a polymeric binding coating surrounding the at least two optical fibers and holding the at least two fibers in a predetermined geometry.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Figure 1A:
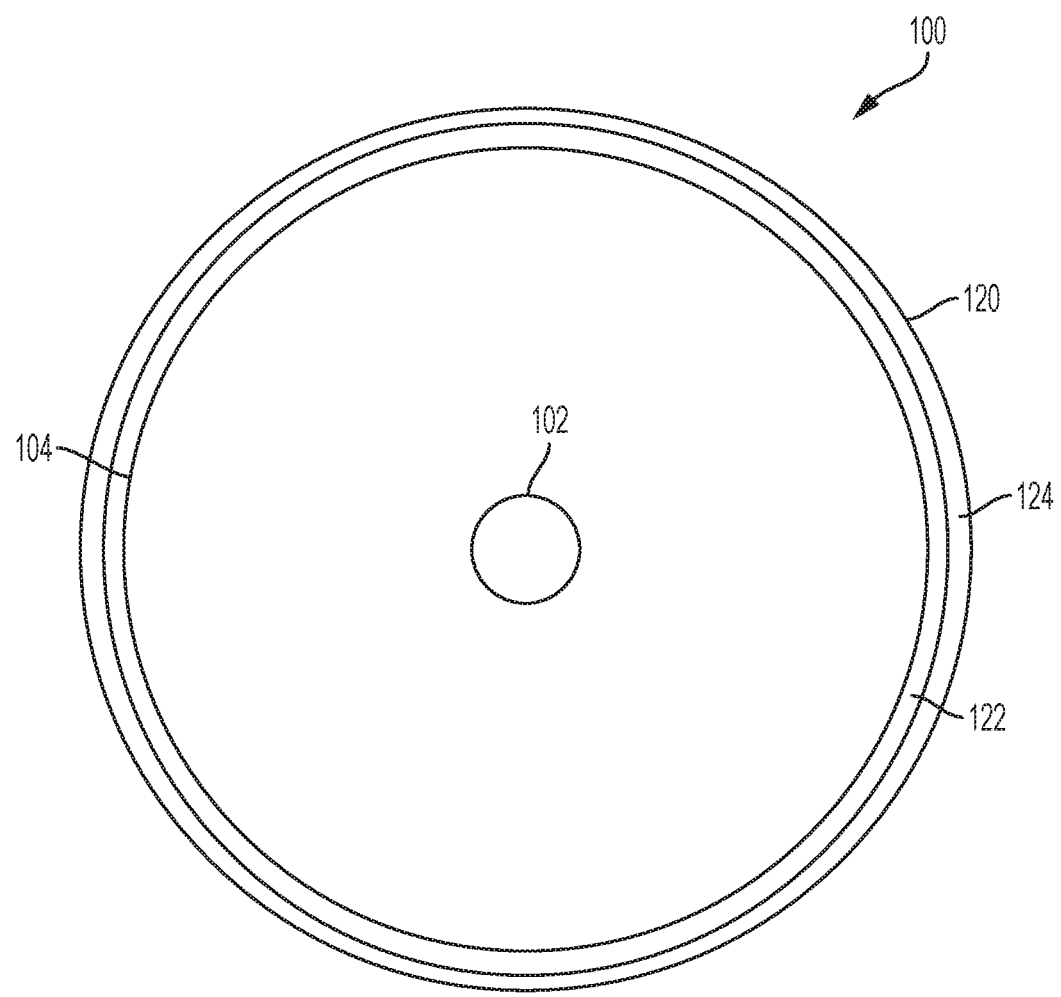
FIG. 1A illustrates a cross section of an optical fiber according to an embodiment of the present disclosure.

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The phrase "refractive index profile," as used herein, refers to the relationship between refractive index or relative refractive index and the dimensions of the optical fiber.

The phrase "relative refractive index," as used herein, is defined as $\Delta\% = 100 \times (n_i^2 - n_{REF}^2)/2n_i^2$, where $n_i$ is the maximum refractive index in region i, unless otherwise specified. The relative refractive index percent is measured at the wavelength of intended operation, often approximately 850 nm, 1300 nm, or 1550 nm unless otherwise specified. Unless otherwise specified herein, $n_{REF}$ is the average refractive index of the outer cladding region of the optical fiber, which can be calculated, for example, by taking "N" index measurements ($n_{c1}, n_{c2}, \ldots, b_{cN}$) of the outer cladding region (which may be, for example, undoped silica), and calculating the average refractive index by:

$$n_C = (1/N) \sum_{i=1}^{i=N} n_{Ci}$$

As used herein, the relative refractive index is represented by $\Delta\%$ and its values are given in units of "%," unless otherwise specified. In cases where the refractive index of a region is less than the reference index $n_{REF}$, the relative index percent is negative and is referred to as a reduced refractive index region or referred to as having a depressed region or depressed-index, and the minimum relative refractive index is calculated at the point at which the relative refractive index is most negative unless otherwise specified. In cases where the refractive index of a region is greater than the reference index $n_{REF}$, the relative index percent is positive and the region can be said to be raised or to have a positive index.

The term "α-profile" or "alpha profile" refers to a relative refractive index profile of the core members, expressed in terms of $\Delta(r)$ which is in units of "%", where r is the radius of the core region, which follows the equation:

$$\Delta(r)\% = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero with respect to the outer cladding region, and r is in the range $r_i \le r \le r_f$, where $\Delta$ is defined above, $r_i$ is the initial point of the α-profile, $r_f$ is the final point of the α-profile, and α is an exponent which is a real number. For a profile segment beginning at the centerline of a core region (r=0), the α-profile has the simpler form:

$$\Delta(r)\% = \Delta(0)(1 - [|r|/(r_1)]^\alpha),$$

where $\Delta(0)$ is the refractive index delta at the centerline of the core region.

A cross section of an optical fiber according to an embodiment of the present disclosure is illustrated in FIG. 1A. The optical fiber 100 includes a core region 102 and an outer cladding region 104 surrounding the core region 102. As shown, the outer circumference of the outer cladding region 104 has a substantially circular shape. The core region 102 of optical fiber 100 is generally formed from silica-based glass and has a core index of refraction $n_1$ and a core relative refractive index $\Delta_1$ relative to the outer cladding region 104. The silica-based glass of the core region 102 is typically doped with one or more dopants which increases the index of refraction of the core region 102, though the cladding can be doped with one or more dopants that reduce its index of refraction to achieve a similar difference relative to the core. For example, the core region 102 may include silica-based glass doped with germanium such as when the core region 102 comprises silica ($SiO_2$) glass up-doped with germania ($GeO_2$). However, dopants other than germania may be utilized in the core region 102, including, without limitation, $TiO_2$, $ZrO_2$, $Nb_2O_5$ and/or $Ta_2O_5$. Such dopants may be incorporated in the core region 102 either individually or in combination in order to obtain the desired core index of refraction $n_1$ and relative refractive index $\Delta_1$. The core region 102 may contain from about 4.0 wt. % to about 40 wt. % $GeO_2$. For example, the core region 102 may include from about 4.0 wt. % to about 6.5 wt. % $GeO_2$, from about 5.0 wt. % to about 6.0 wt. % $GeO_2$, or even from about 5.2 wt. % to about 5.5 wt. % $GeO_2$, which increases the index of refraction $n_1$ of the core members 102 relative to undoped silica glass. In addition, the relative refractive index $\Delta_1$ of the core region 102 relative to outer cladding region 104 is greater than about 0.2%. For example, the relative refractive index $\Delta_1$ of the core region 102 relative to outer cladding region 104 may be greater than about 0.3%, or even from about 0.2% to about 2%.

According to embodiments of the present disclosure, the core region 102 may have a step-index profile, or, alternatively, the core region 102 may have a graded index. The core region 102 may have an α-profile with an α-value which defines the index of refraction of the core region 102 as a function of the radius of the core region 102. Where the core region 102 has an α-profile, the α-value of the α-profile may be in a range from about 1.9 to about 2.2 as measured at 1300 nm. Where the core region 102 has a graded index and/or an α-profile, the core region 102 may have a relative refractive index percent $\Delta_1$ relative to outer cladding region 104 and a maximum relative refractive index percent $\Delta_{1Max}$ of greater than about 0.5% and less than about 2.2%, for example, at least about 0.6%, or at least about 1.0%, or at least about 1.5% or even at least about 2.0%.

The optical fiber 100 may be a single mode optical fiber having a core region 102 with a diameter of less than or equal to about 15 microns. For example, the core region 102 may have a diameter of between about 3 microns and about 10 microns, or between about 6 microns and about 9 microns, or even between about 7 microns and about 8 microns. The optical fiber 100 may be single moded at wavelengths from about 1260 nm to about 1700 nm. Alternatively, the optical fiber 100 may be single-moded at wavelengths from about 1500 nm to about 1700 nm.

Alternatively, the optical fiber 100 may be a multi-mode optical fiber having a core region 102 with a diameter of greater than or equal to about 15 microns. For example, the core region 102 may have a diameter of between about 15 microns and about 65 microns, or between about 25 microns and about 50 microns, or even between about 35 microns and about 50 microns. Multi-mode optical fibers may support the propagation of multiple modes at their operation wavelength and are often used from about 830 nm to about 880 nm. Alternatively, the multi-mode optical fibers may support propagation of multiple modes at wavelengths from about 1020 nm to about 1100 nm, but other wavelength ranges known in the field of optical communication can be used. The core region 102 of the multi-mode optical fiber may generally have a graded refractive index profile. More specifically, the core region of the multi-mode optical fiber may generally have a graded index α profile with an α value of between about 1.9 to about 2.1, as described above.

Figure 1B:
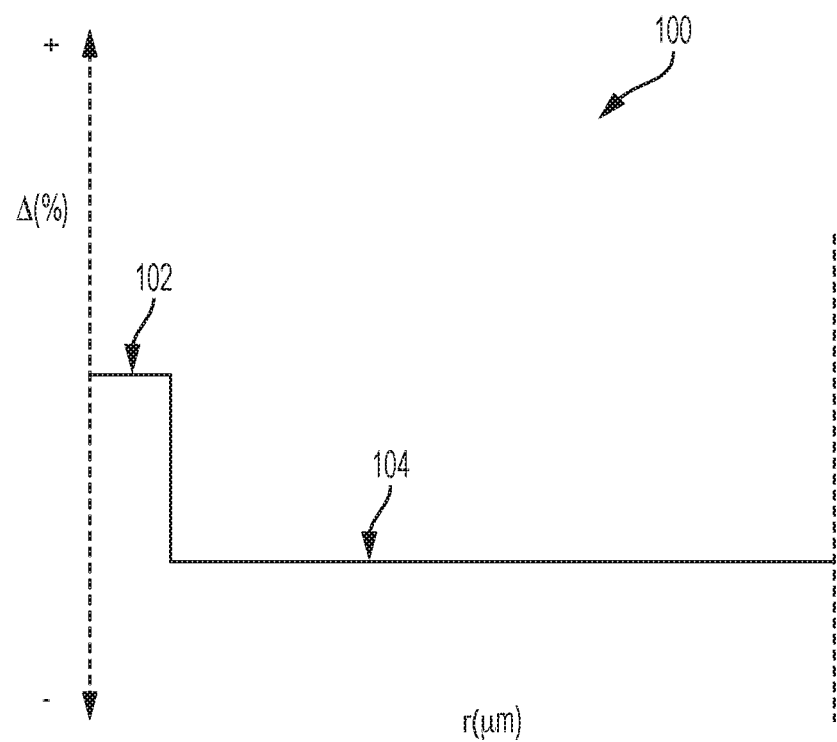
FIG. 1B is a schematic diagram that depicts refractive index as a function of fiber radius for the optical fiber of FIG. 1A.

Referring again to FIG. 1A, the outer cladding region 104 is formed from silica-based glass ($SiO_2$) with an index of refraction $n_2$ which is less than the index of refraction $n_1$ of the core region (i.e., $n_2<n_1$), which yields a refractive index profile as depicted in FIG. 1B. According to embodiments of the present disclosure, the outer cladding region 104 has an outer diameter of less than about 125 microns. For example, the outer cladding region 104 may have an outer diameter of between about 40 microns and about 120 microns, or between about 60 microns and about 80 microns. The outer cladding region 104 may be formed from pure silica-based glass without any dopants which change the index of refraction of silica, such as up-dopants (i.e., germanium and the like) or down-dopants (i.e., boron, fluorine and the like). Alternatively, the outer cladding region 104 may include one or more up-dopants which increase the refractive index of the silica glass, or one or more down-dopants which decrease the refractive index of the silica glass, so long as the cladding index of refraction $n_2$ is less than the core index of refraction $n_1$ and the relative refractive index $\Delta_1$ of the core region 102 relative to the outer cladding region 104 is greater than about 0.2%. For example, the relative refractive index $\Delta_1$ of the core region 102 relative to the outer cladding region 104 may be greater than or equal to about 0.3%, or may be between 0.2% and about 2%.

Optionally, optical fiber 100 may further include at least one coating layer 120 which surrounds and directly contacts the outer cladding region 104. The coating layer 120 is configured to protect the surface of the glass fiber and provides mechanical isolation from the external environment and generally has a thickness of about 10 microns to about 150 microns. The coating layer 120 typically has a refractive index $n_{cr}$ that is greater than or equal to the refractive index $n_2$ of the outer cladding region 104. The coating layer 120 may include a primary coating layer 122 and a secondary coating layer 124. The primary coating layer 122 surrounds and directly contacts the outer cladding region 104 and is formed of relatively soft polymer materials. The primary coating layer 122 has a thickness from about 5.0 microns to about 75 microns. The secondary coating layer 124 is formed around and directly contacts the primary coating layer 122 and has a thickness from about 5.0 microns to about 75 microns. The secondary coating layer 124 is generally formed from polymer materials which are relatively harder than the polymer materials from which the primary coating layer 122 is formed. More specifically, the primary coating layer 122 may exhibit a Young's modulus less than about 100 MPa (for example, less than about 50 MPa, or even less than about 10 MPa), while the secondary coating layer 124 may exhibit a Young's modulus greater than about 500 MPa (for example greater than about 700 MPa, or even greater than about 900 MPa). The materials used in the primary and secondary coating layers are typically UV curable urethane acrylate coating materials. For example, the primary and secondary coatings may include materials similar to those disclosed in U.S. Pat. Nos. 6,849,333 and 6,775,451, the specifications of which are incorporated by reference in their entirety.

While the embodiment of the optical fiber 100 of FIG. 1A is depicted with an coating layer 120 which comprises a primary coating layer 122 and a secondary coating layer 124, it should be appreciated that, in other embodiments, the coating layer 120 only comprises primary coating layer 122. Further, it should be appreciated that the coating layer 120 is optional and that, in some embodiments, optical fiber 100 may be formed without an coating layer 120.

Figure 2A:
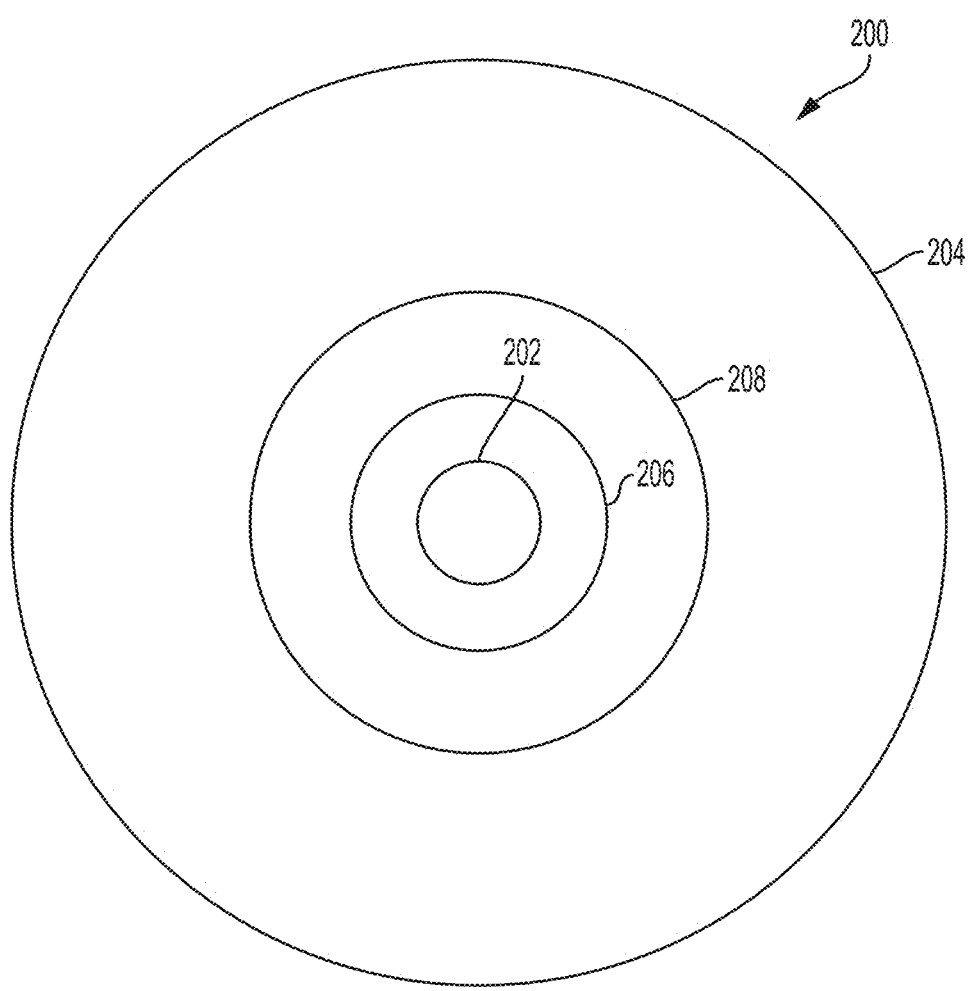
FIG. 2A illustrates a cross section of an optical fiber according to an embodiment of the present disclosure.

A cross section of an optical fiber according to an embodiment of the present disclosure is illustrated in FIG. 2A. As shown, the optical fiber 200 includes a core region 202, an inner cladding region 206 surrounding the core region 202, a reduced refractive index region 208 surrounding inner cladding region 206, and an outer cladding region 204 surrounding the reduced refractive index region 208. As shown, the outer circumference of the outer cladding region 204 has a substantially circular shape. Optical fiber 200 may optionally include at least one optical coating layer, such as described above, which surrounds and directly contacts the outer cladding region 204.

Figure 2B:
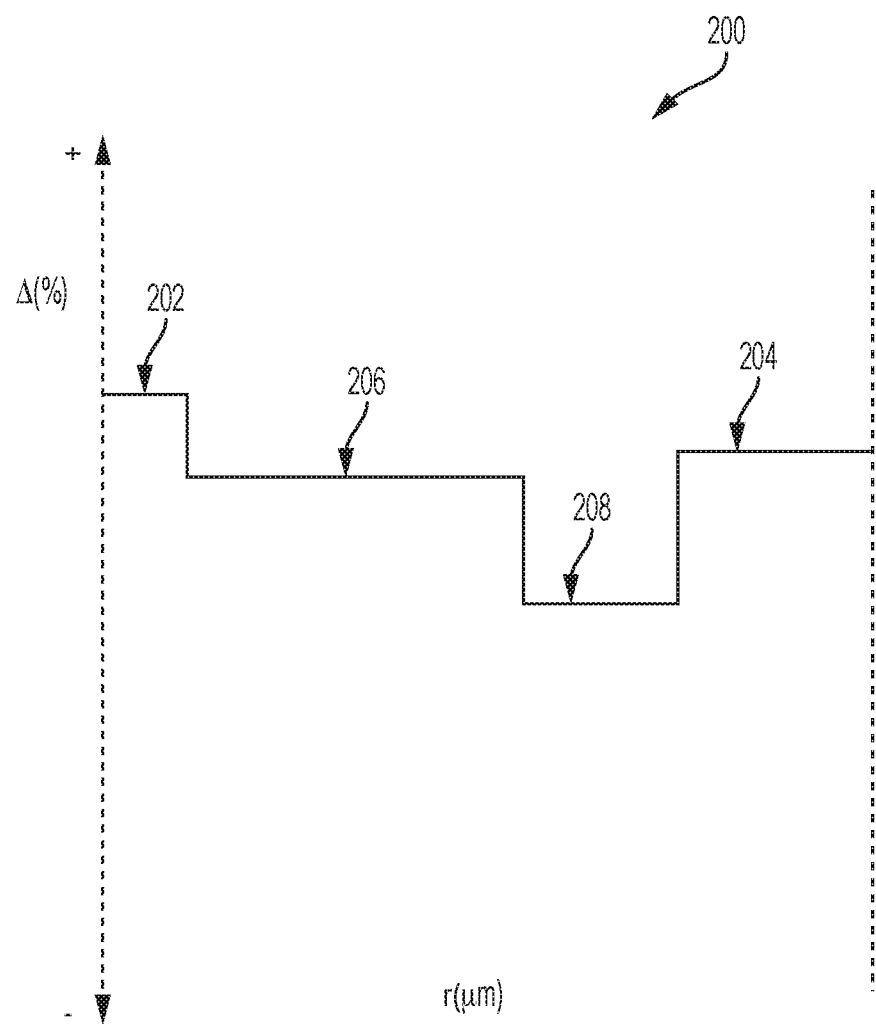
FIG. 2B is a schematic diagram that depicts refractive index as a function of fiber radius for the optical fiber of FIG. 2A.

The inner cladding region 206 generally has an index of refraction $n_3$ that is substantially equal to the index of refraction $n_2$ of the outer cladding region 204 and a radial thickness of greater than about 1 micron. For example, the inner cladding region 206 may have a radial thickness of between about 1 micron and about 13 microns, or even between about 3 microns and about 9 microns. The reduced refractive index region 208 generally has an index of refraction $n_4$ and a radial thickness from about 1 micron to about 20 microns. For example, the radial thickness of the reduced refractive index region 208 may be between about 1 micron and about 10 microns, or even between about 1 micron and about 5 microns. The index of refraction $n_4$ of the reduced refractive index region 208 is such that $n_4 \leq n_2 \leq n_1$ which yields a refractive index profile as depicted in FIG. 2B.

The reduced refractive index region 208 may include silica glass down-doped with fluorine. For example, the reduced refractive index region 208 may include between about 0.36 wt. % and about 3.6 wt. % fluorine, or between about 0.72 wt. % and about 2.5 wt. % fluorine, or even between about 1.4 wt. % and about 2.5 wt. % fluorine such that the relative refractive index percent $\Delta_3$ of the reduced refractive index region 208 relative to outer cladding region 204 is less than about −0.1%, or even less than about −0.4%, or is between about −0.4% to about −0.7%.

Figure 3A:
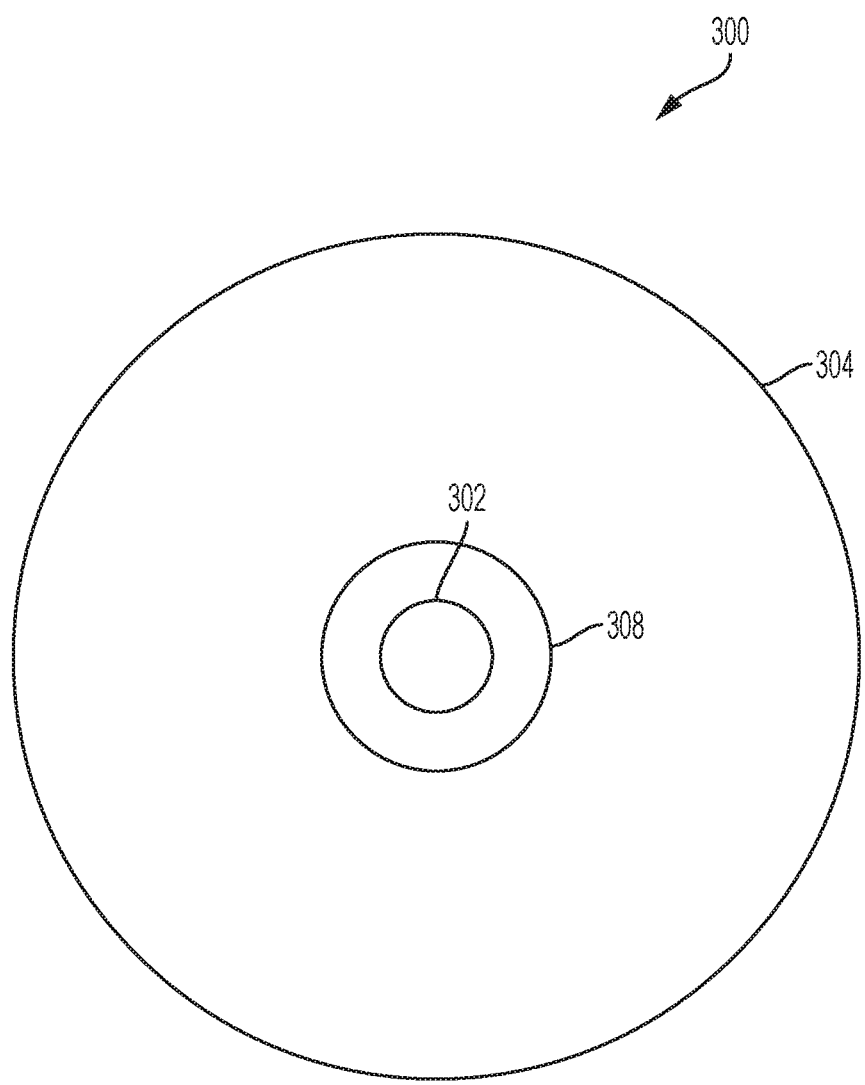
FIG. 3A illustrates a cross section of an optical fiber according to an embodiment of the present disclosure.
Figure 3B:
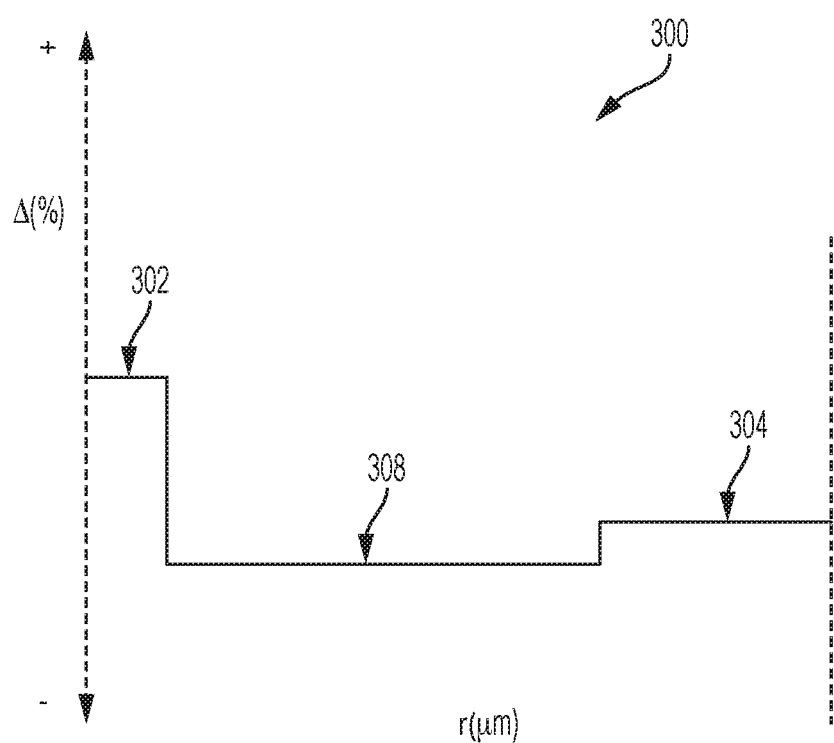
FIG. 3B is a schematic diagram that depicts refractive index as a function of fiber radius for the optical fiber of FIG. 3A.

A cross section of an optical fiber according to an embodiment of the present disclosure is illustrated in FIG. 3. The optical fiber 300 includes a core region 302, a reduced refractive index region 308 surrounding the core region 302, and an outer cladding region 304 surrounding the reduced refractive index region 308. As shown, the outer circumference of the outer cladding region 304 has a substantially circular shape. Optical fiber 300 has the same features as optical fiber 200 shown in FIG. 2A with the exception that optical fiber 300 does not include an inner cladding region. Optical fiber 300 may optionally include at least one optical coating layer, such as described above, which surrounds and directly contacts the outer cladding region 304.

Figure 4A:
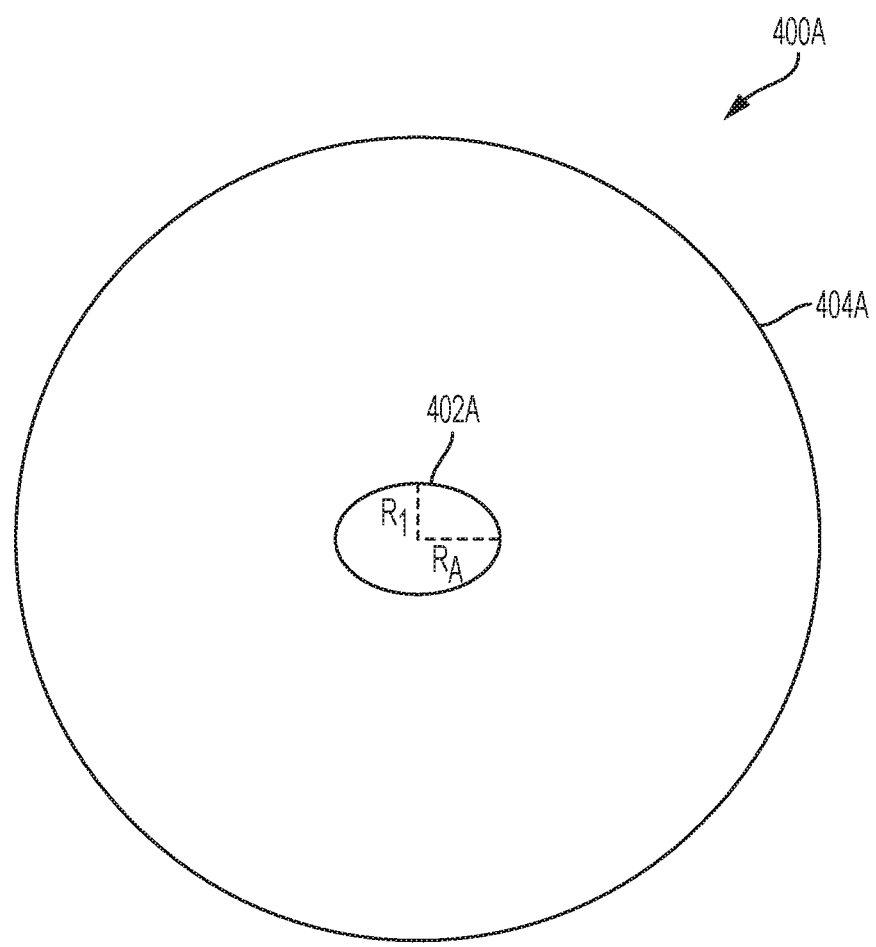
FIG. 4A illustrates a cross section of an optical fiber according to an embodiment of the present disclosure.
Figure 4B:
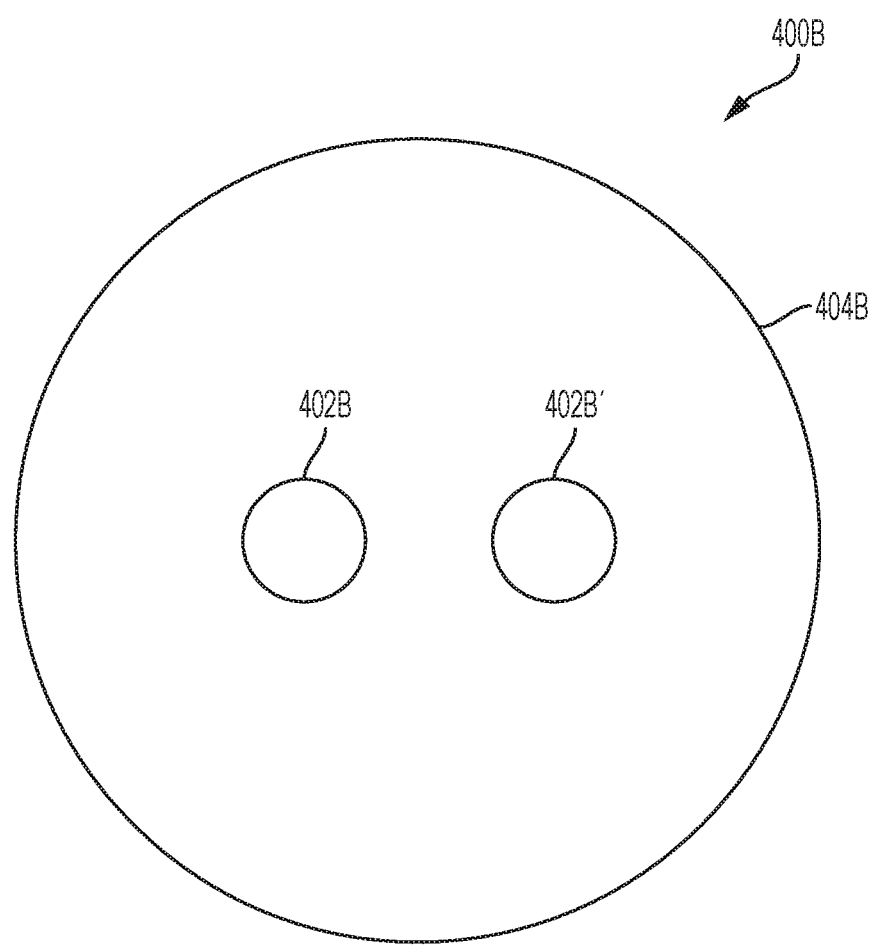
FIG. 4B illustrates a cross section of an optical fiber according to an embodiment of the present disclosure.
Figure 4C:
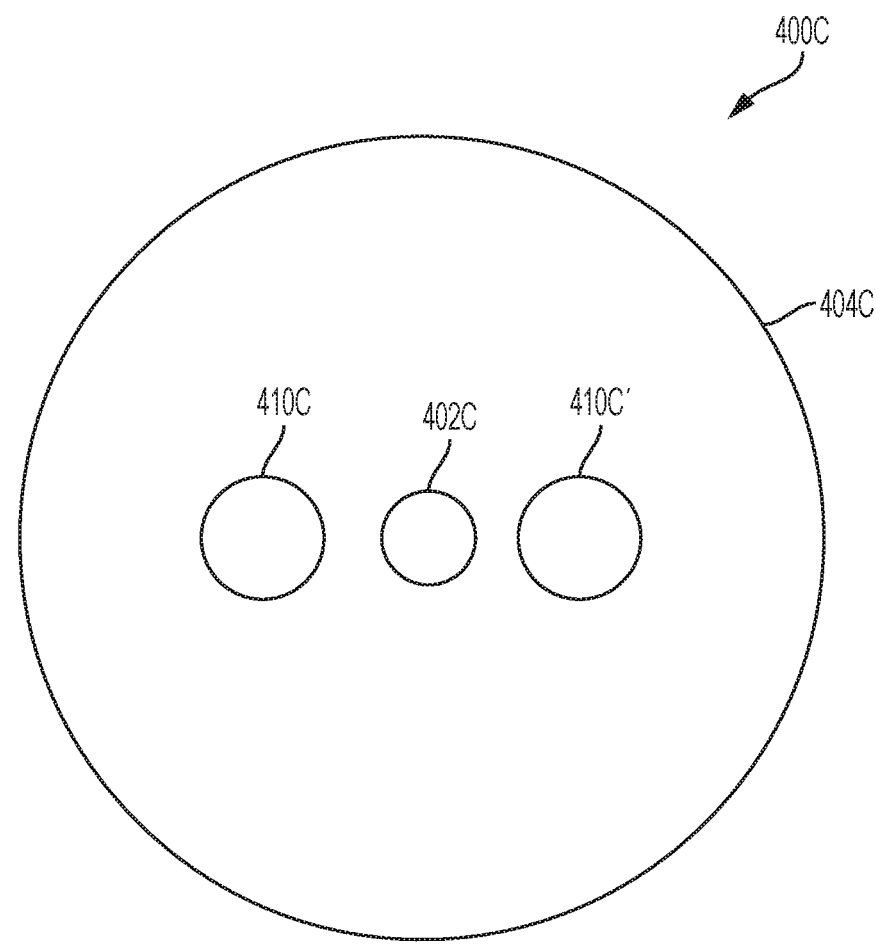
FIG. 4C illustrates a cross section of an optical fiber according to an embodiment of the present disclosure.

FIGS. 4A-4C illustrate cross sections of optical fibers which are similar to optical fiber 100 shown in FIG. 1A, but have various additional features relative to optical fiber 100. FIG. 4A shows an optical fiber 400A including an outer cladding region 404A and an elliptical core region 402A having a radius $R_1$ in a first dimension and radius $R_A$ in a dimension perpendicular to the first dimension, where one of $R_1$ and $R_A$ is greater than the other of $R_1$ and $R_A$. FIG. 4B shows a multicore optical fiber 400B having an outer cladding region 404B and at least two core regions 402B, 402B'. It should be appreciated that a multicore optical fiber such as the one shown in FIG. 4B may include any number of cores. FIG. 4C shows an optical fiber 400C having a core region 402C and an outer cladding region 404C which includes and/or is surrounded by at least two stress rods 410C, 410C' positioned on diametrically opposite sides of the core region 402C. The at least two stress rods 410C, 410C' may be situated such that they touch the core region 402C. Alternatively, the at least two stress rods 410C, 410C' may be situated in close proximity to the core region 402C, such as within 10 microns. For example, an edge of one of the at least two stress rods 410C, 410C' may be located between about 0.1 microns and about 5.0 microns from an edge of the core region 402C. The radius of the at least two stress rods 410C, 410C' may be greater than the edge-to-edge distance between the core region 402C and one of the at least two stress rods 410C, 410C'. Additionally, the edge-to-edge distance is less than the diameter of the core region 402C. The cross-section of the at least two stress rods 410C, 410C' may be circular, but may optionally be of other shapes. The at least two stress rods 410C, 410C' may be of equal or non-equal size. The at least two stress rods 410C, 410C' may have a radius of between about 2.5 μm and about 20 μm. For example, the at least two stress rods may have a radius of between about 5.0 μm and about 15 μm, or between about 10 μm and about 25 μm, or even between about 10 μm and about 20 μm. Optical fibers 400A, 400B, 400B may optionally include at least one optical coating layer, such as described above, which surrounds and directly contacts the outer cladding region 404A, 404B, 404C.

Figure 5A:
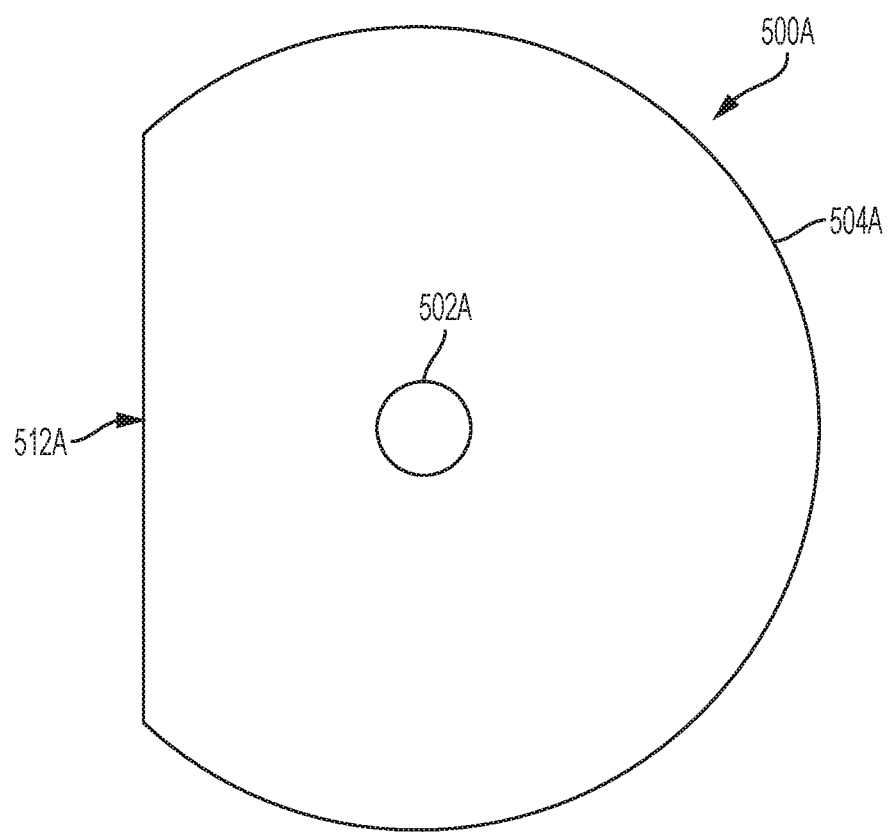
FIG. 5A illustrates a cross section of an optical fiber according to an embodiment of the present disclosure.
Figure 5B:
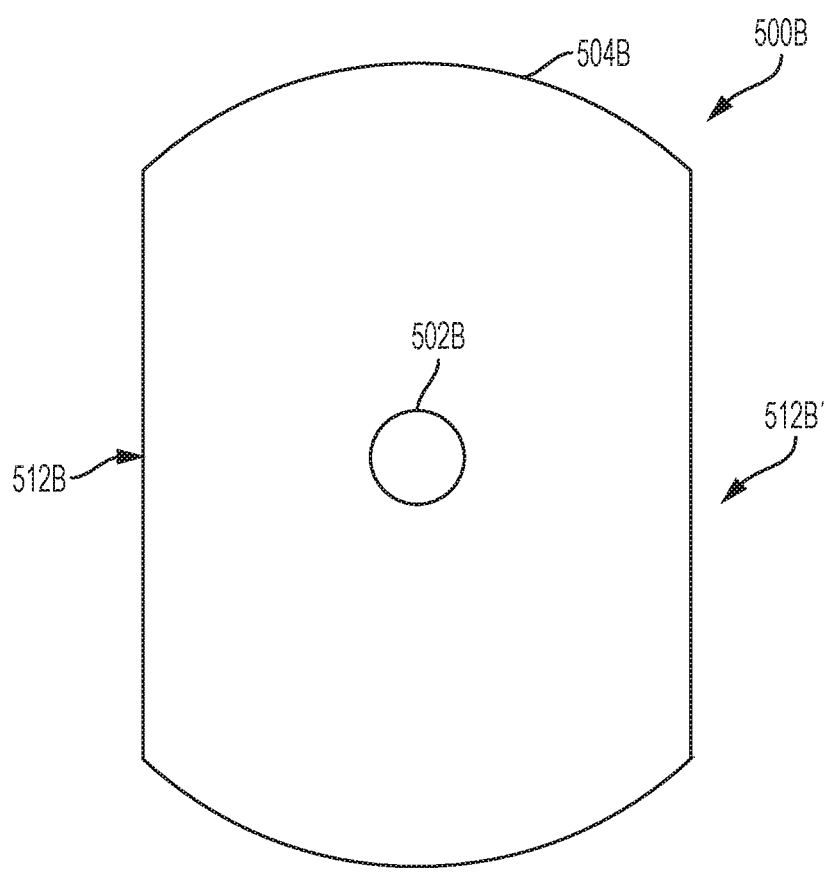
FIG. 5B illustrates a cross section of an optical fiber according to an embodiment of the present disclosure.

Cross sections of optical fibers according to embodiments of the present disclosure are illustrated in FIGS. 5A-5B. For purposes of illustration, the optical fibers of FIGS. 5A-5B are shown having the features of optical fiber 100 shown in FIG. 1A. However, it should be appreciated that the optical fibers of FIGS. 5A-5B may include any of the features of the optical fibers shown in FIG. 2, 3 or 4A-4C. As shown, the optical fibers 500A, 500B have core regions 502A, 502B respectively, and the same features of optical fiber 100 of FIG. 1A, with the exception that at least a portion of the outer perimeter of the outer cladding region 504A, 504B is substantially flat. As used herein, the term "flat" is meant to describe a portion of an optical fiber that continues in approximately a single plane and is curved or rounded significantly less than an extension of the adjacent rounded surfaces. As shown in FIG. 5A the perimeter of the outer cladding region 504A may have a flat portion 512A with the rest of the perimeter being substantially circular. As shown in FIG. 5B, the perimeter of the outer cladding region 504B may have at least two flat portions 512B, 512B' with the other portions of the perimeter being substantially curved portions. Optical fibers 500A, 500B may optionally include at least one optical coating layer, such as described above, which surrounds and directly contacts the outer cladding region 504A, 504B.

Figure 6:
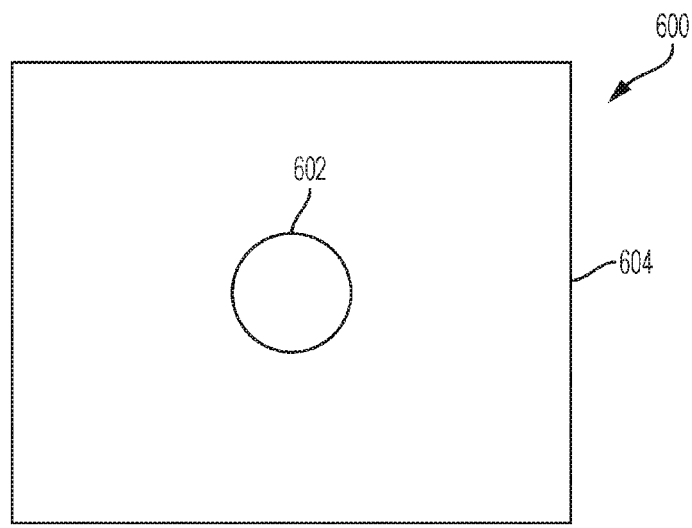
FIG. 6 illustrates a cross sections of an optical fiber according to an embodiment of the present disclosure.

A cross section of an optical fiber according to an embodiment of the present disclosure is illustrated in FIG. 6. As shown, the optical fiber 600 has a core region 602 and an outer cladding region 604. For purposes of illustration, the optical fiber 600 is shown having the features of optical fiber 100 shown in FIG. 1A. However, it should be appreciated that opt cal fiber 600 may include any of the features of the optical fibers shown in FIG. 2, 3 or 4A-4C. As shown, the optical fiber 600 has the same features of optical fiber 100 of FIG. 1A, with the exception that the outer perimeter of the outer cladding region 604 has a non-circular shape. As shown in FIG. 6, optical fiber 600 has four edges that have portions that are substantially flat. As measured from flat edges of the outer cladding 604 situated opposite each other, optical fiber 600 has a width of less than about 125 microns. For example, optical fiber 600 may have a width of between about 40 microns and about 120 microns, or between about 60 microns and about 80 microns. Optical fiber 600 may optionally include at least one optical coating layer, such as described above, which surrounds and directly contacts the outer cladding region 604.

Various multi-optical fiber aggregates in accordance with embodiments of the present disclosure will now be described. As used herein, the term "aggregate" is meant to describe at least two optical fibers held together by a polymeric binding coating. Embodiments of the present disclosure provide multi-optical fiber aggregates having high spatial density. Employment of optical fibers having diameters or widths as described herein reduces the size of the aggregates as compared to conventional optical fiber ribbons and also permits the inclusion of a greater number of cores than are commonly employed in conventional optical fiber ribbons. Furthermore, employment of optical fibers as described herein permits reduced distances between adjacent cores as compared to conventional optical fiber ribbons.

Figure 7:
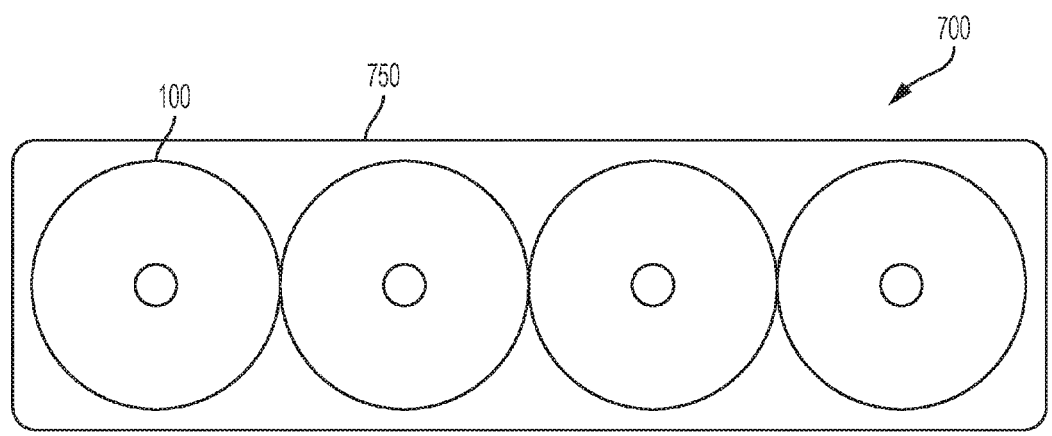
FIG. 7 illustrates a cross section of multi-optical fiber aggregate according to an embodiment of the present disclosure.
Figure 8:
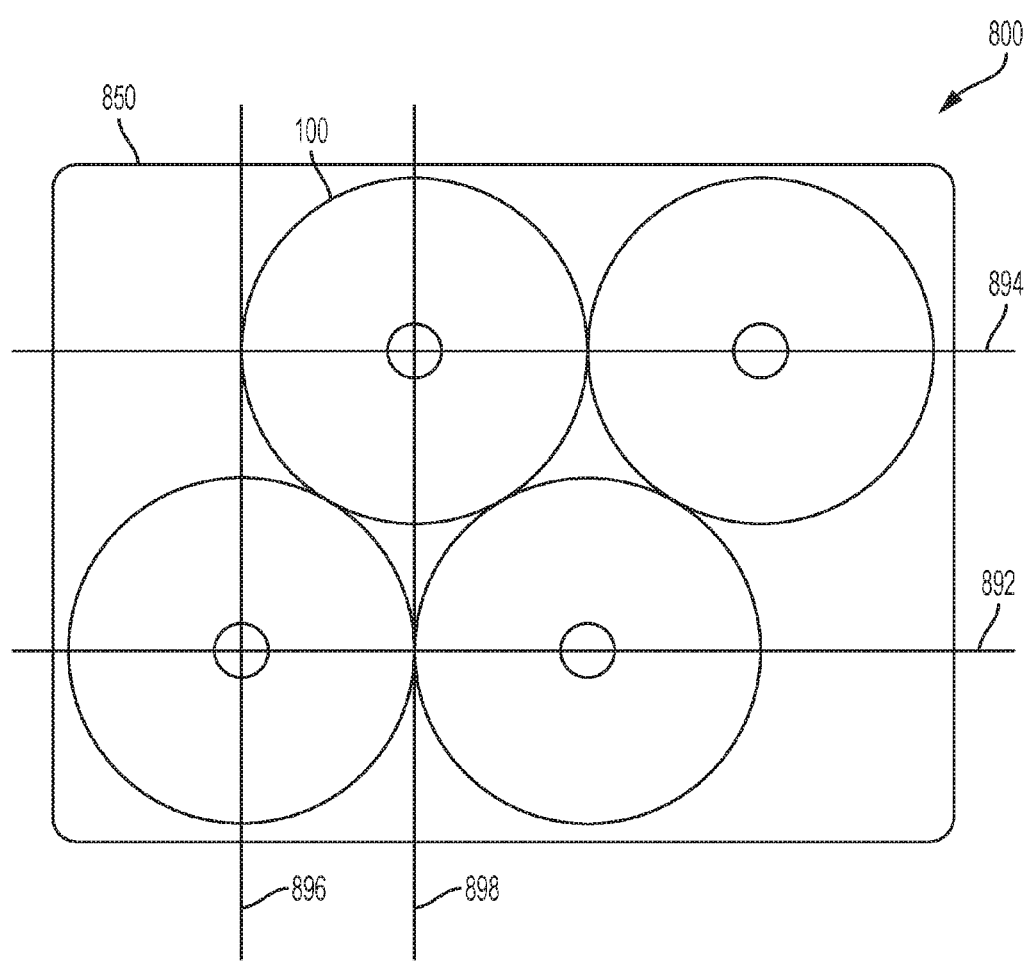
FIG. 8 illustrates a cross section of multi-optical fiber aggregate according to an embodiment of the present disclosure.
Figure 9:
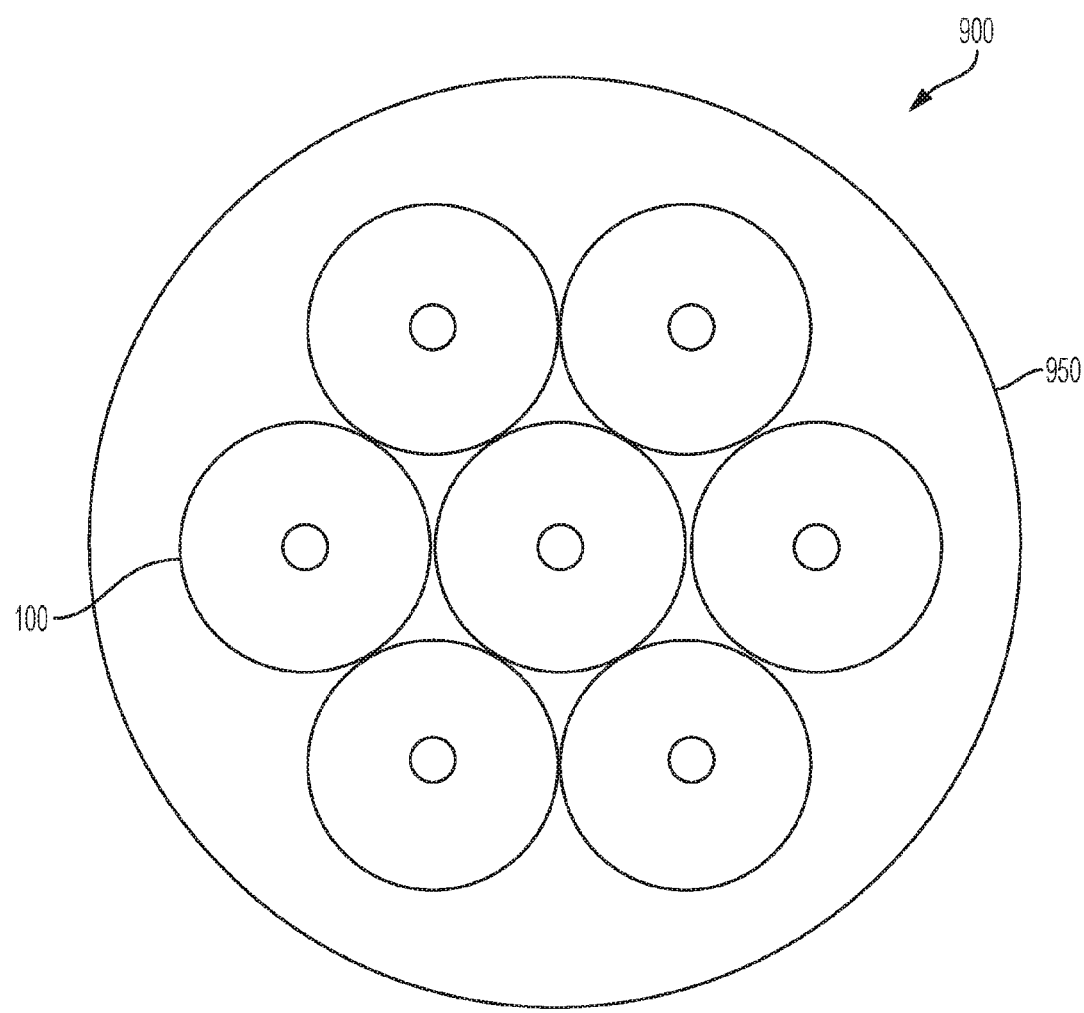
FIG. 9 illustrates a cross section of multi-optical fiber aggregate according to an embodiment of the present disclosure.

FIGS. 7-9 illustrate cross sections of various multi-optical fiber aggregates in accordance with embodiments of the present disclosure. For purposes of illustration, the aggregates of FIGS. 7-9 are shown with a plurality of optical fibers each having the features of optical fiber 100 shown in FIG. 1. However, it should be appreciated that the optical fibers of the aggregates of FIGS. 7-9 may include any of the features of the optical fibers shown in FIG. 1, 2, 3, 4A-4C or 6, and that, according to certain embodiments, the aggregates may include combinations of optical fibers having different features.

A cross section of a multi-optical fiber aggregate according to an embodiment of the present disclosure is illustrated in FIG. 7. As shown, the multi-optical fiber aggregate 700 includes a plurality of optical fibers 100 and a polymeric binding coating 750 surrounding the plurality of optical fibers 100 and holding the plurality of optical fibers 100 in a predetermined geometry. The optical fibers 100 may be oriented such that a portion of each optical fiber 100 physically contacts a portion of at least one adjacent optical fiber 100. Alternatively, the optical fibers may be oriented such that a portion of each optical fiber 100 is less than about 15 microns from a portion of at least one adjacent optical fiber 100. For example, a portion of each optical fiber 100 may be less than about 10 microns, or less than about 5.0 microns, or even about 1.0 micron from a portion of at least one adjacent optical fiber 100. The aggregate 700 shown in FIG. 7 includes a plurality of optical fibers 100 oriented in parallel in a single plane. While the aggregate 700 of FIG. 7 includes four optical fibers, it should be appreciated that aggregates according to embodiments of the present disclosure include at least two optical fibers and may include any number of optical fibers.

A cross section of a multi-optical fiber aggregate according to an embodiment of the present disclosure is illustrated in FIG. 8. As shown, the multi-optical fiber aggregate 800 includes a plurality of optical fibers 100 and a polymeric binding coating 850 surrounding the plurality of optical fibers 100 and holding the plurality of optical fibers 100 in a predetermined geometry. The optical fibers 100 may be oriented such that a portion of each optical fiber 100 physically contacts a portion of at least one adjacent optical fiber 100. Alternatively, the optical fibers may be oriented such that a portion of each optical fiber 100 is less than 15 microns from a portion of at least one adjacent optical fiber 100. For example, a portion of each optical fiber 100 may be less than about 10 microns, or less than about 5.0 microns, or even about 1.0 micron from a portion of at least one adjacent optical fiber 100. The aggregate 800 shown in FIG. 8 includes two sets of two optical fibers 100 with each set of optical fibers 100 being oriented in different parallel planes. For example, a first set is oriented such that the optical fibers 100 are bisected by a first horizontal plane 892, and a second set is oriented such that the optical fibers 100 are bisected by a second horizontal plane 894 which is parallel with the first plane 892. Additionally, optical fibers in the first set may be offset from optical fibers 100 in the second set such that they are not bisected by the same vertical plane. For example, an optical fiber 100 of the first set is oriented such that it is bisected by a first vertical plane 896, and an optical fiber 100 of the second set is oriented such that it is bisected by a second vertical plane 898 which is parallel with the first vertical plane 892. While the aggregate 800 of FIG. 8 includes four optical fibers oriented in two planes, it should be appreciated that aggregates according to embodiments of the present disclosure include at least two optical fibers and may include any number of optical fibers oriented in any number of parallel planes.

A cross section of a multi-optical fiber aggregate according to an embodiment of the present disclosure is illustrated in FIG. 9. As shown, the multi-optical fiber aggregate 900 includes a plurality of optical fibers 100 and a polymeric binding coating 950 surrounding the plurality of optical fibers 100 and holding the plurality of optical fibers 100 in a predetermined geometry. The optical fibers 100 may be oriented such that a portion of each optical fiber 100 physically contacts a portion of at least one adjacent optical fiber 100. Alternatively, the optical fibers may be oriented such that a portion of each optical fiber 100 is less than 15 microns from a portion of at least one adjacent optical fiber 100. For example, a portion of each optical fiber 100 may be less than about 10 microns, or less than about 5.0 microns, or even about 1.0 micron from a portion of at least one adjacent optical fiber 100. The aggregate 900 shown in FIG. 9 includes six optical fibers 100 surrounding a central optical fiber and forming a circular aggregate. While the aggregate 900 of FIG. 9 includes seven optical fibers oriented in a circular geometry, it should be appreciated that aggregates according to embodiments of the present disclosure may include any number of optical fibers necessary to form a circular geometry.

Figure 10:
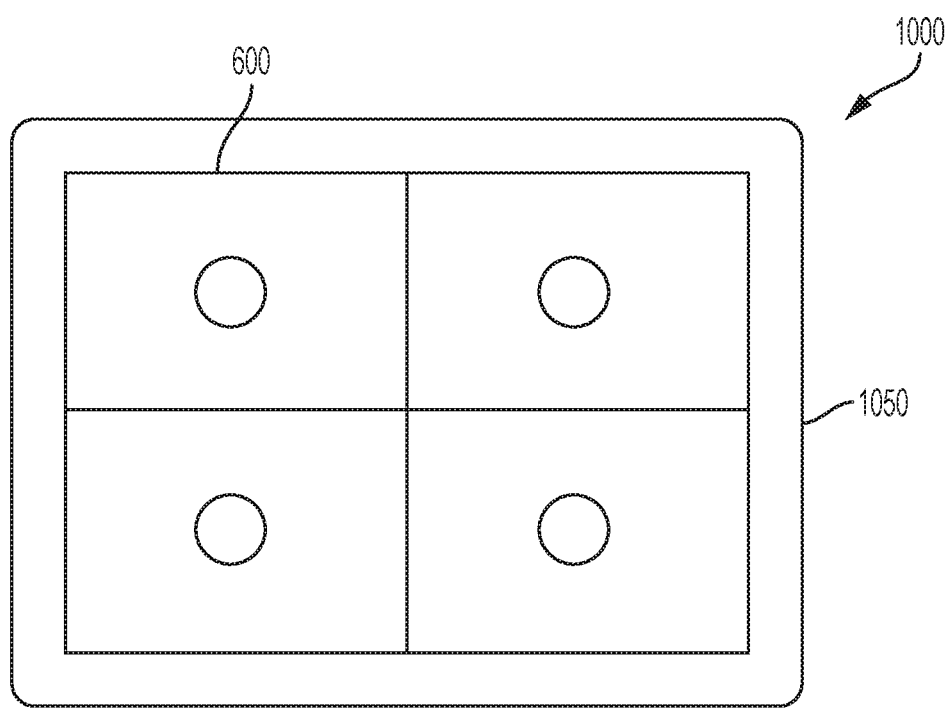
FIG. 10 illustrates a cross section of multi-optical fiber aggregate according to an embodiment of the present disclosure.
Figure 11:
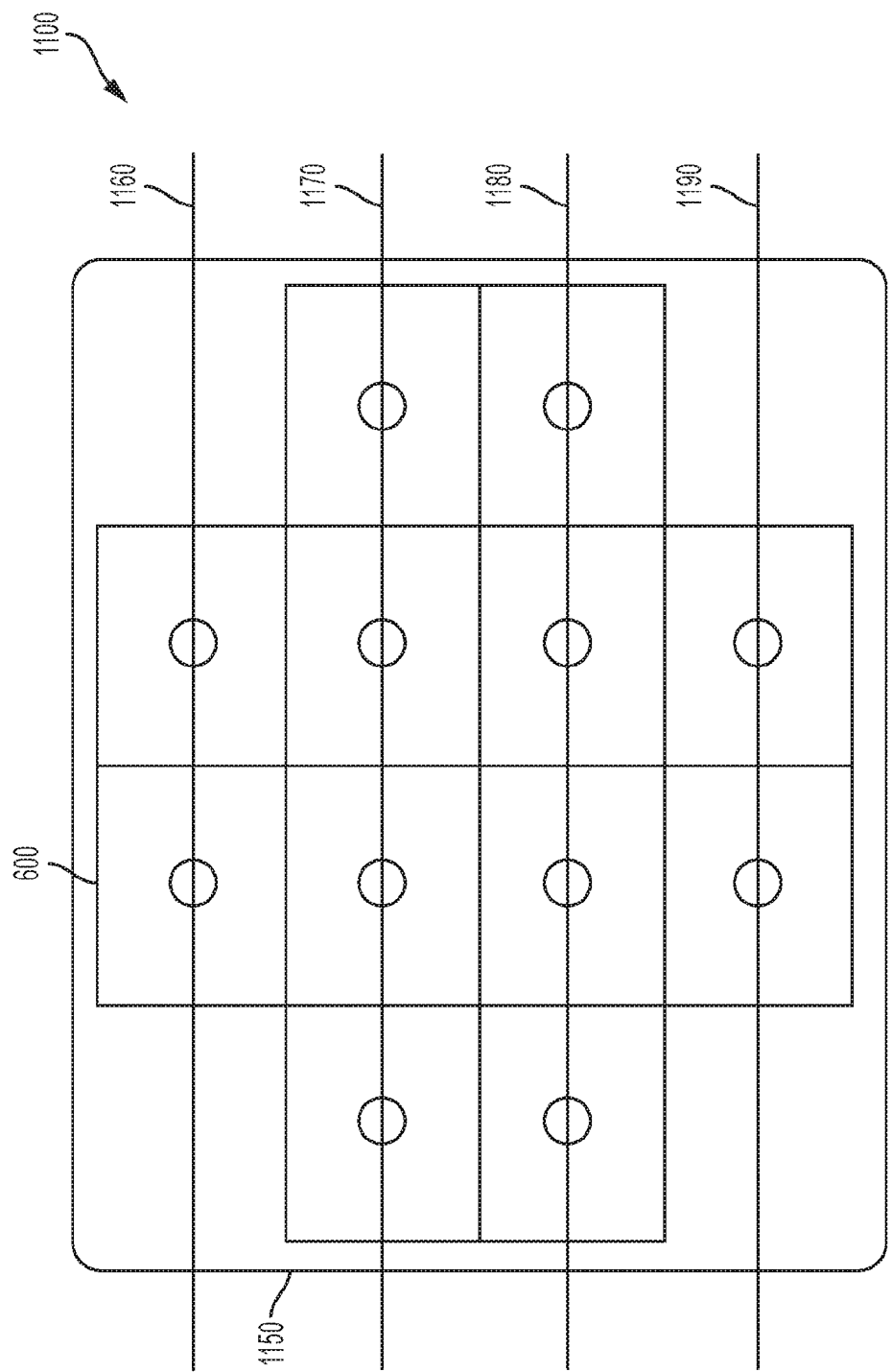
FIG. 11 illustrates a cross section of multi-optical fiber aggregate according to an embodiment of the present disclosure.

FIGS. 10-11 illustrate cross sections of various multi-optical fiber aggregates in accordance with embodiments of the present disclosure. For purposes of illustration, the aggregates of FIGS. 10-11 are shown with a plurality of optical fibers having the features of optical fiber 600 shown in FIG. 6. However, it should be appreciated that the optical fibers of the aggregates of FIGS. 10-11 may include any of the features of the optical fibers shown in FIG. 1, 2, 3 or 1A-4C, and that, according to certain embodiments, the aggregates may include combinations of optical fibers having different features.

A cross section of a multi-optical fiber aggregate according to an embodiment of the present disclosure is illustrated in FIG. 10. As shown, the multi-optical fiber aggregate 1000 includes a plurality of optical fibers 600 and a polymeric binding coating 1050 surrounding the plurality of optical fibers 600 and holding the plurality of optical fibers 600 in a predetermined geometry. The optical fibers 600 may be oriented such that a portion of each optical fiber 600 physically contacts a portion of at least one adjacent optical fiber 600. Alternatively, the optical fibers may be oriented such that a portion of each optical fiber 600 is less than 15 microns from a portion of at least one adjacent optical fiber 600. For example, a portion of each optical fiber 600 may be less than about 10 microns, or less than about 5.0 microns, or even about 1.0 micron from a portion of at least one adjacent optical fiber 600. The aggregate 1000 shown in FIG. 10 includes two sets of two optical fibers 600 with each set of optical fibers 600 being oriented in different parallel planes. While the aggregate 1000 of FIG. 10 includes four optical fibers oriented in two planes, it should be appreciated that aggregates according to embodiments of the present disclosure include at least two optical fibers and may include any number of optical fibers oriented in any number of parallel planes. As a further example, FIG. 11 illustrates a cross section of a multi-optical fiber aggregate having different sets of optical fibers 600 having different numbers of optical fibers 600, where each set is oriented such that the optical fibers 600 are bisected by different parallel planes. As shown, the aggregate 1100 includes a first set of two optical fibers 600 bisected by a first horizontal plane 1160, a second set of four optical fibers 600 bisected by a second horizontal plane 1170, a third set of four optical fibers 600 bisected by a third horizontal plane 1180, and a fourth set of two optical fibers 600 bisected by a second horizontal plane 1190.

Figure 12:
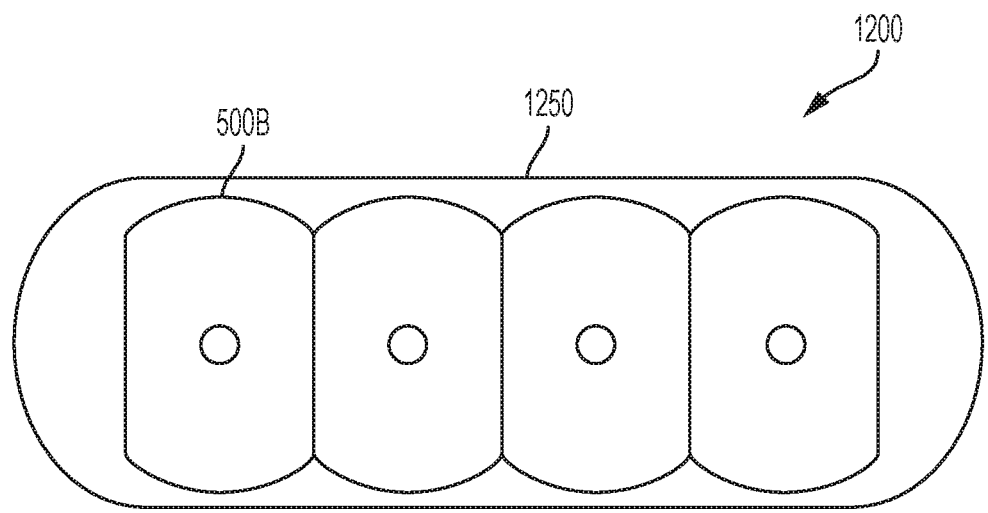
FIG. 12 illustrates a cross section of multi-optical fiber aggregate according to an embodiment of the present disclosure.
Figure 13:
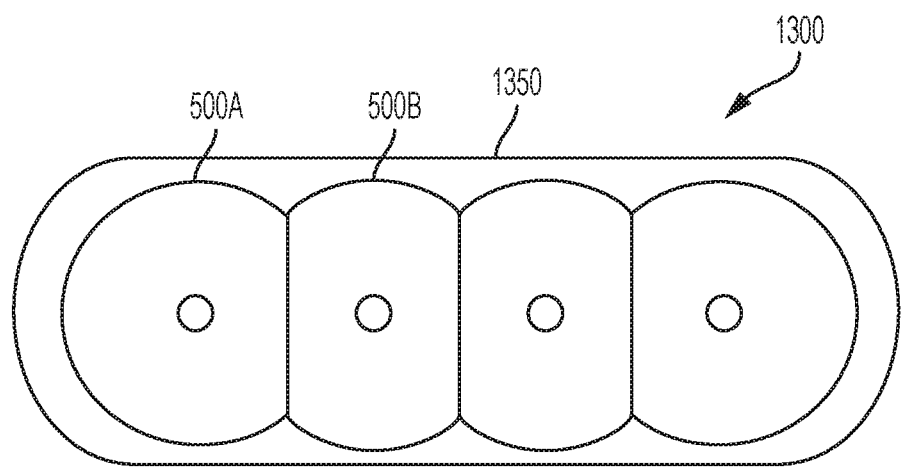
FIG. 13 illustrates a cross section of multi-optical fiber aggregate according to an embodiment of the present disclosure.

FIGS. 12-13 illustrate cross sections of various multi-optical fiber aggregates in accordance with embodiments of the present disclosure. For purposes of illustration, the aggregates of FIGS. 12-13 are shown with a plurality of optical fibers having the features of optical fibers 500 shown in FIGS. 5A-5C. However, it should be appreciated that the optical fibers of the aggregates of FIGS. 12-13 may include any of the features of the optical fibers shown in FIG. 1, 2, 3, 4A-4C or 6, and that, according to certain embodiments, the aggregates may include combinations of optical fibers having different features.

A cross section of a multi-optical fiber aggregate according to an embodiment of the present disclosure is illustrated in FIG. 12. As shown, the multi-optical fiber aggregate 1200 includes a plurality of optical fibers 500B each having two flat portions, and a polymeric binding coating 1250 surrounding the plurality of optical fibers 500B and holding the plurality of optical fibers 500B in a predetermined geometry. The optical fibers 500B may be oriented such that a portion of each optical fiber 500B physically contacts a portion of at least one adjacent optical fiber 500B. Alternatively, the optical fibers may be oriented such that a portion of each optical fiber 500B is less than 15 microns from a portion of at least one adjacent optical fiber 500B. For example, a portion of each optical fiber 500B may be less than about 10 microns, or less than about 5.0 microns, or even about 1.0 micron from a portion of at least one adjacent optical fiber 500B. The aggregate 1200 shown in FIG. 12 includes a plurality of optical fibers 500B oriented in parallel in a single plane. While the aggregate 1200 of FIG. 12 includes four optical fibers, it should be appreciated that aggregates according to embodiments of the present disclosure include at least two optical fibers and may include any number of optical fibers.

FIG. 13 illustrates a similar aggregate as shown in FIG. 12. As shown, the multi-optical fiber aggregate 1300 includes a fiber arrangement 1360 having a plurality of optical fibers 500B each having at least two flat portions, with two optical fibers 500A, each having one flat portion, situated at each end of the plurality of optical fibers 500B, where the flat portion of optical fibers 500A faces a flat portion of an adjacent optical fiber 500B of the plurality of optical fibers 500B. The optical fibers 500A, 500B may be oriented such that a portion of each optical fiber 500A, 500B physically contacts a portion of at least one adjacent optical fiber 500A, 500B. Alternatively, the optical fibers may be oriented such that a portion of each optical fiber 500A, 500B is less than 15 microns from a portion of at least one adjacent optical fiber 500A, 500B. For example, a portion of each optical fiber 500A, 500B may be less than about 10 microns, or less than about 5.0 microns, or even about 1.0 micron from a portion of at least one adjacent optical fiber 500A, 500B The aggregate 1300 also includes a polymeric binding coating 1250 surrounding the fiber arrangement 1360 and holding the optical fibers 500B in a predetermined geometry. The fiber arrangement 1360 shown in FIG. 13 includes a plurality of optical fibers 500B oriented in parallel in a single plane. While the fiber arrangement 1360 includes two optical fibers 500B, it should be appreciated that the fiber arrangement may include any number of optical fibers 500B.

According to embodiments of the present disclosure, the polymeric binding coating 750, 850, 950, 1050, 1150, 1250, 1350 may be formed from the same polymer materials as the secondary coating layer 124 described above.

Aggregates according to embodiments of the present disclosure include optical fibers spaced apart from one another such that the cross-talk between adjacent optical fibers is less than −25 dB. For example, cross-talk between adjacent optical fibers may be less than −30 dB, or less than −35 dB and, or even less than −40 dB.

Embodiments of the present disclosure provide multi-optical fiber aggregates which can be formed with repeatable geometries. Multi-optical fiber aggregates according to the embodiments of the present disclosure include a high optical fiber core density. For example, flat portions of the multi-optical fiber aggregates and the optical fiber of the aggregates, such as those shown in FIGS. 10-13, facilitate such high core density. Furthermore, the flat portions limit the movement of the optical fibers, and in turn, the optical fiber cores, when a polymeric binding coating is applied to the optical fibers during formation of a multi-optical fiber aggregate and maintains the optical fiber and optical fiber core relative positions. This in turn promotes high alignment tolerances when the multi-optical fiber aggregate are coupled to sources, detectors or other optical fiber portions.

As compared to other optical fiber solutions, the high optical fiber core density of the aggregates described herein decreases the amount of space needed to either house optical fiber, or to connect one location to another location via optical fiber. Additionally, the aggregates described herein have an increased bandwidth over a cross-section of the aggregate as compared to the bandwidth over the same cross-section of other optical fiber solutions. The high optical fiber core density of the aggregates described herein also promotes a reduction in the costs of source devices or other optical devices and components. The cost of such devices is directly related to the size of the devices and the size of the devices is generally proportional to the size of the device-fiber interface. By decreasing the size of the device-fiber interface, the high optical fiber core density can lead to a decrease in the size of the devices, and in turn, a decrease in the costs of such devices.

Additionally, the multi-optical fiber aggregate designs described herein enable forming separate and individual optical fibers prior to formation of the aggregate. This allows for quality and performance testing to be performed on the optical fibers prior to inclusion of the individual optical fibers in the aggregate, and ensures that all of the at least two optical fibers of the aggregate meet predetermined quality and performance standards.

It will be apparent to those skilled in the art that various modifications and variations can be made without departing from the spirit or scope of the claims.

What is claimed is:

1. A multi-optical fiber aggregate comprising:
at least two optical fibers, each of the at least two optical fibers having a core region formed from a silica-based glass having an index of refraction $n_1$, and an outer cladding layer formed from a silica-based glass surrounding and in direct contact with the core region; and
a polymeric binding coating surrounding and in direct contact with the outer cladding layer of each of the at least two optical fibers and holding the at least two fibers in a predetermined geometry,
wherein the outer cladding layer comprises a reduced refractive index region having an index of refraction $n_4$ and an outer cladding region having an index of refraction $n_2$, and
wherein $n_4 < n_2 < n_1$.

2. The multi-fiber aggregate of claim 1, wherein the at least two optical fibers have a diameter of less than about 125 microns.

3. The multi-fiber aggregate of claim 2, wherein the at least two optical fibers have a diameter of between about 40 microns and about 120 microns.

4. The multi-optical fiber aggregate of claim 1, wherein the outer cladding layer further comprises an inner cladding region surrounding the core region, wherein the reduced refractive index region surrounds the inner cladding region.

5. The multi-optical fiber aggregate of claim 1, wherein the reduced refractive index region comprises silica-based glass doped with fluorine.

6. The multi-optical fiber aggregate of claim 1, wherein the at least two optical fibers comprise a substantially circular shape.

7. The multi-optical fiber aggregate of claim 1, wherein at least a portion of the at least two optical fibers is substantially flat.

8. The multi-optical fiber aggregate of claim 1, wherein at least one of the at least two optical fibers comprises a multicore fiber.

9. The multi-optical fiber aggregate of claim 1, wherein at least one of the at least two optical fibers comprises an elliptical core region.

10. The multi-optical fiber aggregate of claim 1, wherein at least one of the at least two optical fibers comprises at least two stress rods surrounding the core region.

11. The multi-optical fiber aggregate of claim 1, wherein a portion of the at least two optical fibers physically contacts a portion of at least one adjacent optical fiber.

12. The multi-optical fiber aggregate of claim 1, wherein a portion of the at least two optical fibers is less than about 15 microns from a portion of at least one adjacent optical fiber.

13. The multi-optical fiber aggregate of claim 1 comprising at least two sets of at least two optical fibers, wherein optical fibers of adjacent sets are oriented in different parallel planes in a first dimension, and wherein the optical fibers are oriented such that optical fibers of adjacent sets are not bisected by the same plane in a second dimension, wherein the first dimension is perpendicular to the second dimension.

14. The multi-optical fiber aggregate of claim 7, wherein the substantially flat portion of a first of the at least two optical fibers physically contacts the substantially flat portion of at least one other of the at least two optical fibers.

* * * * *